Oct. 9, 1928.

H. W. KING ET AL 1,687,215

LIQUID DEPTH INDICATING DEVICE

Filed Nov. 5, 1923

Inventor
Horace W. King
William E. Bandemer

By Whittemore Hulbert Whittemore
+Belknap  Attorney

Patented Oct. 9, 1928.

1,687,215

UNITED STATES PATENT OFFICE.

HORACE W. KING AND WILLIAM E. BANDEMER, OF ANN ARBOR, MICHIGAN, ASSIGNORS TO KING-SEELEY CORPORATION, OF ANN ARBOR, MICHIGAN, A CORPORATION OF MICHIGAN.

LIQUID-DEPTH-INDICATING DEVICE.

Application filed November 5, 1923. Serial No. 673,002.

The invention relates to depth indicating devices for liquids and is designed particularly for use in motor vehicles to measure the gasoline in the supply tank. The main object of the invention is the provision of a liquid depth indicating device which is so arranged that the indicating liquid in the pressure gage cannot be forced or withdrawn therefrom either when compressed air is forced into the gasoline supply tank to blow out any sediment which has collected in the gasoline feed line, when the supply tank is suddenly filled with gasoline, or when the level of the gasoline in the supply tank is lower than the air chamber of the device, or when the air vent of the supply tank is clogged and the gasoline is being withdrawn from the supply tank.

Figure 1:
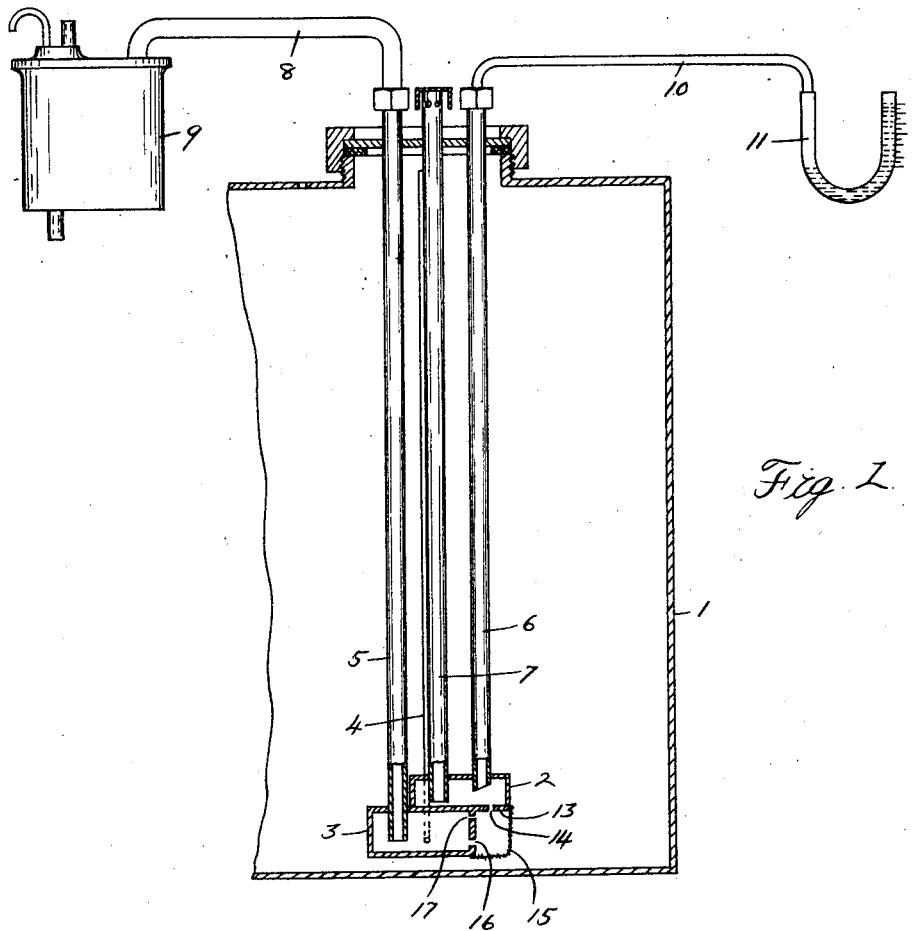
Figure 1 is a sectional elevation of a system including a liquid depth indicating device which embodies our invention.

As shown in the present instance, the liquid depth indicating device is associated with the gasoline tank and vacuum tank of a motor vehicle and is designed to measure the depth of the gasoline in the gasoline tank.

1 is the gasoline supply tank which is suitably vented and to which our liquid depth indicating device is applied. This device comprises the superposed air chamber 2, the feeding chamber 3, the air supply tube 4, the suction tube 5, the pressure tube 6, and the vent tube 7, all of these tubes extending parallel to each other and forming a unit with the air and feeding chambers.

The air supply tube 4 has an open lower end communicating with the interior of the feeding chamber 3 near its bottom and an open upper end communicating with the interior of the supply tank 1 above the level of the gasoline therein. The suction tube 5 has an open lower end communicating with the interior of the feeding chamber near its bottom, and an upper end communicating through the pipe 8 with the source of vacuum which is preferably the vacuum tank 9. The pressure tube 6 has an open beveled lower end communicating with the air chamber 2 near its top and an upper end communicating through the pipe 10 with the pressure gage 11 which is preferably U-shaped and contains a suitable indicating liquid. The vent tube 7 has an open lower end communicating with the interior of the air chamber near its bottom and an upper end communicating with the air above the supply tank.

To provide for the proper operation of the device including the automatic replenishing of the air chamber with air, and the placing of the air chamber in communication with the gasoline in the supply tank and at the same time to avoid any possibility of the indicating liquid in the pressure gage being forced or withdrawn therefrom while blowing any sediment out of the system or suddenly filling the supply tank, or withdrawing the gasoline from the supply tank by means of the vacuum tank when the level of the gasoline in the supply tank is below the air chamber or when the air vent in the supply tank is cloggd the air chamber 2 is laterally offset with respect to the feeding chamber 3 and is provided in the laterally offset portion 13 of its bottom wall with the restricted opening 14 for placing the air chamber in communication with the gasoline in the supply tank. This opening must not be directly under the vent tube and is laterally offset relative thereto. 15 is a finely meshed screen inclosing the space below the laterally offset portion of the air chamber 2 and at the side of the feeding chamber 3. 16 is a gasoline inlet opening into the feeding chamber 3 and communicating with the screened-in space, this opening being near the bottom of the feeding chamber. 17 is a restricted opening near the top of the feeding chamber for placing the top of this feeding chamber in communication with the screened-in space. The opening 17 is slightly larger than the opening 14 in the present instance.

With this arrangement, the vacuum tank 9, in drawing gasoline from the supply tank 1, produces a flow of the gasoline through the finely meshed screen 15, the inlet opening 16, the feeding chamber 3, the suction tube 5, and the pipe 8 connecting into the vacuum tank. At the beginning of this operation, any gasoline standing in the air supply tube 4 is drawn therefrom and then air is drawn downwardly therethrough into the feeding chamber and commingled with the gasoline therein, part of this air being drawn through the suction tube 5, and part of the air being trapped in the upper portion of the feeding chamber. As soon as the vacuum tank ceases to draw gasoline from the supply tank, this trapped air is displaced by gasoline and escapes through the restricted opening 17, some of it entering the air chamber 2 through the restricted opening 14, thereby replenishing this air chamber with air. Any excess air within the air chamber escapes upwardly through the vent tube 7, the lower end of which is sealed by gasoline occupying the lower portion of the air chamber to a height even with the lower end of the vent tube and extending upwardly within the vent tube to a height even with the level of the gasoline in the tank.

Figure 2:
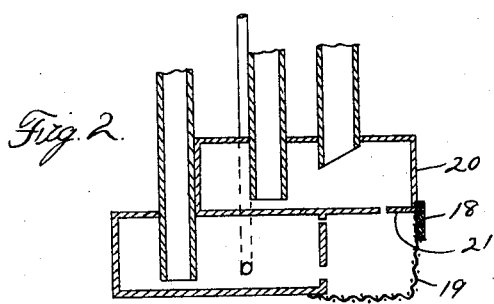
Figure 2 is a sectional elevation of a modified construction of liquid depth indicating device.

In the modified construction disclosed in Figure 2, the arrangement of depth indicating device is the same as that shown in Figure 1, with the exception that the solder 18 for securing the finely meshed screen 19 to the air chamber 20 extends downwardly slightly below the bottom of the air chamber and serves to trap the air below the laterally offset portion 21 of the bottom wall of the air chamber, thereby assuring a greater supply of air for the air chamber.

By reason of providing an opening in the bottom wall of the air chamber and laterally offset from the feeding chamber, this opening forming the sole passage for the air into the air chamber from the feeding chamber, and also placing the air chamber in communication with the gasoline in the supply tank, it is impossible to draw the indicating liquid from the pressure gage by operation of the vacuum tank regardless of the depth of the gasoline in the supply tank. Furthermore, it is impossible to blow the indicating liquid from the pressure gage by forcing air into the supply tank or by suddenly filling the supply tank, since the opening into the air chamber is restricted, and since the pressure required to force the gasoline within the vent tube out through its upper end is less than that required to force the indicating liquid from the pressure gage.

What we claim as our invention is:

1. In a liquid depth indicating device, the combination of a pair of superposed chambers with an imperforate wall between the chambers for preventing direct communication therebetween, the chambers communicating with the liquid to be measured, the upper chamber having a portion laterally offset relative to the lower chamber, said offset portion being provided with an opening for the passage of air and the lower chamber being provided with a passageway for air therefrom located with respect to the opening in the upper chamber so that some of the air may pass from the lower chamber through the opening, means for introducing air into the lower chamber, a pressure gauge and means for placing said gauge in communication with the upper chamber.

2. In a liquid depth indicating device the combination of a pair of superposed chambers with an imperforate wall between the chambers for preventing direct communication therebetween, the upper of the chambers having a portion laterally offset relative to the lower chamber, said offset portion being provided in the bottom thereof with a single hole for placing the upper chamber in communication with the liquid to be measured, the lower of the chambers communicating with the liquid to be measured and having means forming a passageway for air therefrom located with respect to the single hole so that some of the air passing from the passageway forming means may enter through the single hole, means for introducing air into the lower of the chambers, a pressure gauge and means for placing said gauge in communication with the upper chamber.

3. In a liquid depth indicating device, the combination of a pair of superposed chambers with an imperforate wall between the chambers for preventing direct communication therebetween, the upper of the chambers being laterally offset beyond the lower of the chambers and the wall having a portion laterally offset beyond the lower of the chambers provided with an opening, the lower of the chambers communicating with the liquid to be measured and having an opening near the upper edge thereof at the side of the space below the laterally offset portion of the wall whereby air may pass from the lower of the chambers to the opening in the laterally offset portion of the wall, means for introducing air into the lower chamber, a pressure gauge and means for placing said gauge in communication with the upper chamber.

4. In a liquid depth indicating device, the combination of a pair of superposed chambers with an imperforate wall for preventing direct communication therebetween, the upper of the chambers being laterally offset beyond the lower of the chambers and the wall being laterally offset beyond the lower of the chambers provided with an opening, the lower of the chambers having an opening near the upper edge thereof at the side of the space below the laterally offset portion of the wall whereby air may pass from the lower of the chambers through the opening in the laterally offset portion of the wall, the lower of the chambers also having a lower opening for placing the same in communication with the liquid to be measured, means for drawing liquid and air into the lower of the chambers, a pressure gauge and means for placing said gauge in communication with the upper chamber.

5. In a liquid depth indicating device, the combination of upper and lower chambers laterally offset relative to each other to provide a space below the upper chamber and at the side of the lower chamber, the bottom wall of the upper chamber having an imperforate portion between the chambers and an apertured portion laterally offset relative to the lower chamber to place the upper chamber in communication with the space and the side wall of the lower chamber having an opening therein also communicating with the space, means for introducing air into the lower chamber, a pressure gauge and means for placing said gauge in communication with the upper chamber.

In testimony whereof we affix our signatures.

HORACE W. KING.
WILLIAM E. BANDEMER.